(12) United States Patent
Guerin

(10) Patent No.: US 11,635,135 B2
(45) Date of Patent: Apr. 25, 2023

(54) SEALING PLUG FOR A REDUCER CASING, BEARING A MESHING PLAY-COMPENSATING CARRIAGE

(71) Applicant: JTEKT EUROPE, Irigny (FR)

(72) Inventor: Mickael Guerin, Brindas (FR)

(73) Assignee: JTEKT EUROPE, Irigny (FR)

( * ) Notice: Subject to any disclaimer, the term of this patent is extended or adjusted under 35 U.S.C. 154(b) by 235 days.

(21) Appl. No.: 16/615,006

(22) PCT Filed: May 25, 2018

(86) PCT No.: PCT/FR2018/051232
§ 371 (c)(1),
(2) Date: Nov. 19, 2019

(87) PCT Pub. No.: WO2018/220317
PCT Pub. Date: Dec. 6, 2018

(65) Prior Publication Data
US 2020/0208735 A1 Jul. 2, 2020

(30) Foreign Application Priority Data
May 31, 2017 (FR) ..................................... 17/54827

(51) Int. Cl.
*F16H 57/12* (2006.01)
*F16H 55/24* (2006.01)
(Continued)

(52) U.S. Cl.
CPC ............. *F16H 57/12* (2013.01); *F16H 55/24* (2013.01); *F16H 1/16* (2013.01); *F16H 57/021* (2013.01);
(Continued)

(58) Field of Classification Search
CPC . F16H 57/12; F16H 55/24; F16H 1/16; F16H 57/021; F16H 57/039;
(Continued)

(56) References Cited

U.S. PATENT DOCUMENTS 10,378,639 B2 * 8/2019 Kim ..................... B62D 5/0409
2009/0255751 A1 * 10/2009 Kondo ...................... F16H 1/16
384/535

(Continued)

FOREIGN PATENT DOCUMENTS

EP 2 492 167 A1 8/2012
EP 2 754 600 A1 7/2014
(Continued)

OTHER PUBLICATIONS

Sep. 25, 2018 Search Report issued in International Patent Application No. PCT/FR2018/051232.

*Primary Examiner* — Zakaria Elahmadi
(74) *Attorney, Agent, or Firm* — Oliff PLC

(57) ABSTRACT

A plug for closing an opening of a casing, the plug including a solid hub, with central axis, as well as a retaining member which ensures the axial attachment of the plug in the opening, the plug including a play-compensating carriage, which is distinct from the hub and which is movably mounted on a guiding support borne by the hub, the guiding support being arranged in such a way as to axially retain the carriage and to guide the relative movement of the carriage with respect to the hub in a direction termed the "play-compensating direction" transverse to the central axis, a spring-type resilient member, arranged between the guiding support and the carriage, and an orientating member arranged so as to orientate the plug, and consequently the play-compensating direction defined by the guiding support, (Continued)

in azimuth around the central axis, according to a predetermined orientation with respect to the casing.

11 Claims, 2 Drawing Sheets

(51) Int. Cl.
    *F16H 1/16*     (2006.01)
    *F16H 57/021*     (2012.01)
    *F16H 57/039*     (2012.01)
    *F16H 57/02*     (2012.01)
    *F16H 57/022*     (2012.01)

(52) U.S. Cl.
    CPC .... *F16H 57/039* (2013.01); *F16H 2057/0213* (2013.01); *F16H 2057/0222* (2013.01); *F16H 2057/02082* (2013.01); *F16H 2057/127* (2013.01)

(58) Field of Classification Search
    CPC ... F16H 2057/02082; F16H 2057/0213; F16H 2057/0222; F16H 2057/127
    See application file for complete search history.

(56) References Cited

U.S. PATENT DOCUMENTS

| | | | | |
|---|---|---|---|---|
| 2010/0116582 A1* | 5/2010 | Rho | ........................ | F16H 55/24 180/444 |
| 2011/0067946 A1* | 3/2011 | Kim | ..................... | B62D 5/0409 180/444 |
| 2014/0174843 A1* | 6/2014 | Kimoto | ................... | F16H 55/24 180/444 |
| 2014/0352467 A1* | 12/2014 | Kwon | ................... | B62D 5/0409 74/400 |
| 2015/0040707 A1* | 2/2015 | Hong | ................... | H02K 7/1166 74/425 |
| 2015/0059506 A1* | 3/2015 | Kwon | ..................... | F16C 25/06 74/425 |
| 2015/0107384 A1* | 4/2015 | Kwon | ................... | B62D 5/0409 74/89.14 |
| 2016/0185381 A1* | 6/2016 | Noguchi | ................. | F16H 57/12 180/444 |
| 2016/0201760 A1* | 7/2016 | Kwon | ..................... | F16H 55/24 74/409 |
| 2016/0236707 A1* | 8/2016 | Oberle | ................. | F16H 57/039 |
| 2016/0318544 A1* | 11/2016 | Kawamura | .......... | B62D 5/0409 |
| 2016/0318545 A1* | 11/2016 | Uchihara | ............. | B62D 5/0454 |
| 2016/0319906 A1* | 11/2016 | Kawamura | .......... | B62D 5/0454 |
| 2017/0183026 A1* | 6/2017 | Lee | ........................ | B62D 3/10 |
| 2017/0197653 A1* | 7/2017 | Park | ..................... | B62D 5/0409 |
| 2018/0003268 A1* | 1/2018 | Song | ................... | H02K 7/1166 |
| 2018/0304915 A1* | 10/2018 | Kawamura | ............... | F16H 1/16 |
| 2019/0031228 A1* | 1/2019 | Shimoda | ............... | F16H 55/24 |
| 2019/0040945 A1* | 2/2019 | Ueda | ..................... | F16H 57/022 |
| 2019/0234505 A1* | 8/2019 | Ishii | ..................... | B62D 5/0409 |
| 2019/0285157 A1* | 9/2019 | Segawa | ................... | F16H 55/22 |
| 2020/0116249 A1* | 4/2020 | Cho | ........................ | F16H 1/16 |

FOREIGN PATENT DOCUMENTS

| | | |
|---|---|---|
| EP | 3 095 672 A1 | 11/2016 |
| FR | 2 974 833 A1 | 11/2012 |
| JP | 2013-71679 A | 4/2013 |
| WO | 2016/047189 A1 | 3/2016 |
| WO | 2016/148248 A1 | 9/2016 |
| WO | WO-2016148248 A1 * | 9/2016 ............... B62D 5/04 |

* cited by examiner

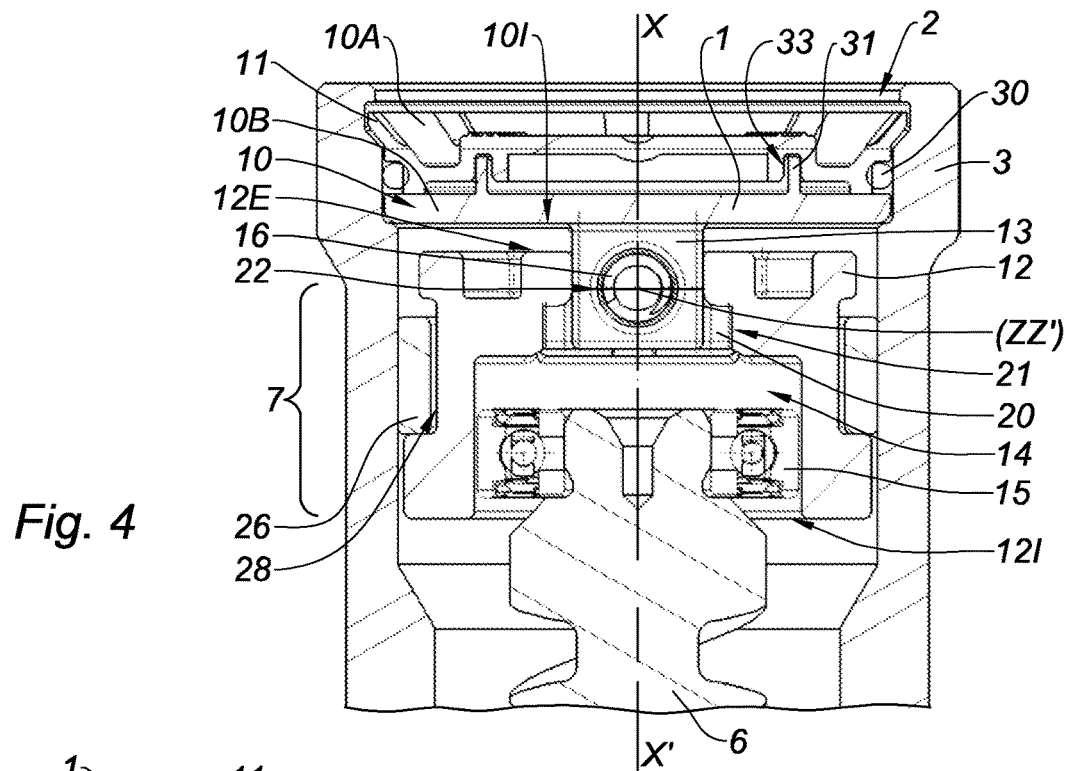
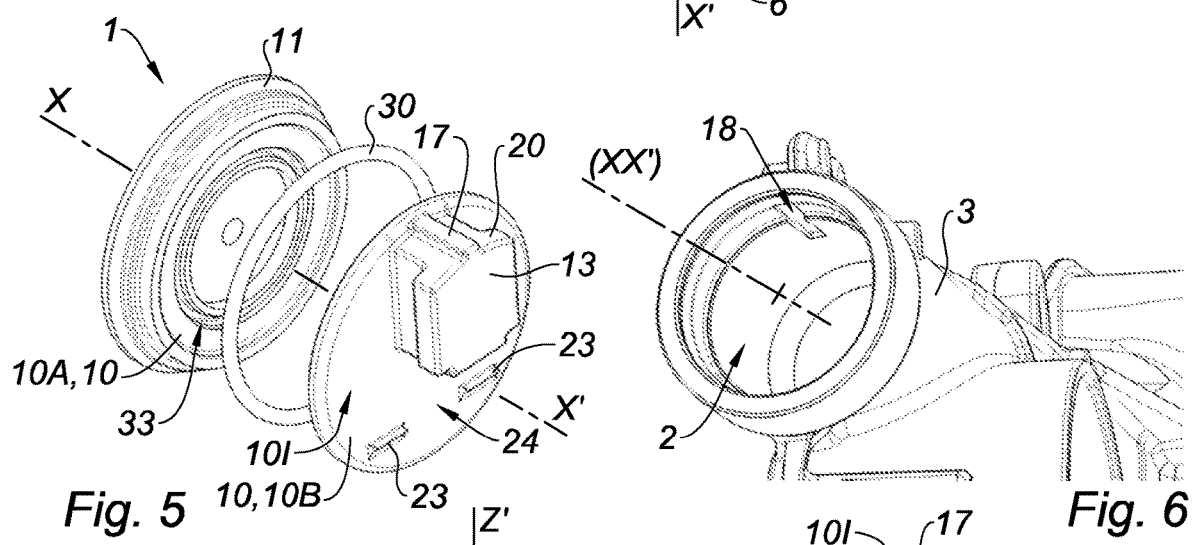
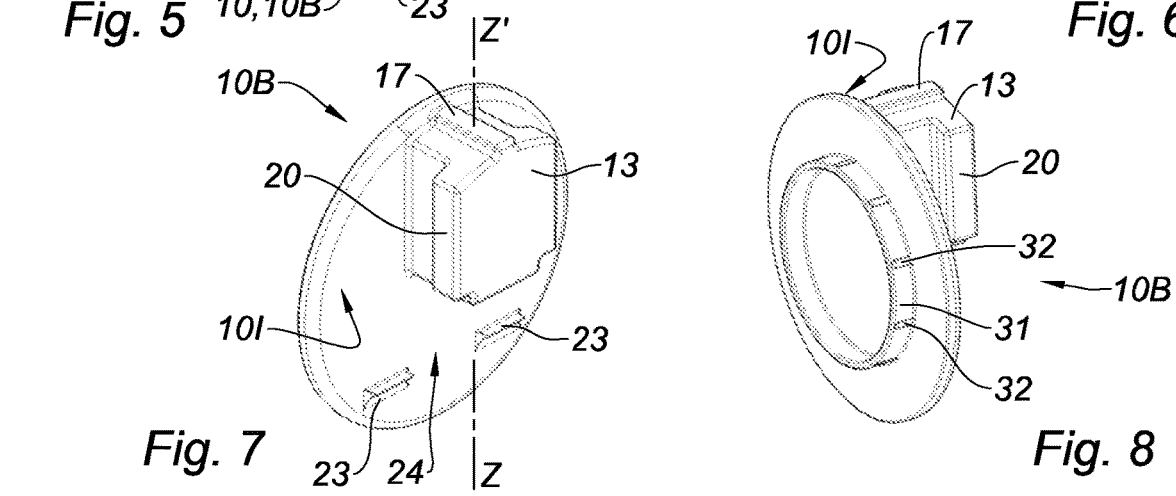

SEALING PLUG FOR A REDUCER CASING, BEARING A MESHING PLAY-COMPENSATING CARRIAGE

The present invention concerns the arrangement of the casings intended to protect mechanisms, and in particular gear mechanisms, such as gear reducers, and more particularly gear reducers intended for power steering systems for vehicles.

Such casings generally comprise one or several access orifice(s), which pass through the wall of said casing to enable the introduction and the assembly of all or part of the mechanism in the casing.

These access orifices must be plugged by means of plugs, so as to prevent the intrusion of water or foreign bodies inside the casing, or the loss of lubricant, and thus guarantee sustainable proper operation of the mechanism protected by the casing.

Moreover, it is also known to provide, within the gear mechanisms, for a backlash compensation device («anti-backlash system») which presses the toothings of the gear elements against each other.

The known backlash compensation devices effectively limit the meshing noises, and are adapted to compensate for both the wear of the mechanism as well as the effects of variations in temperature or hygrometry.

Yet, the known lash compensation devices however have some complexity, and, in this respect, may include a large number of parts and/or require complex machining of the casing, which tends to complicate the manufacturing and assembly operations, and increase the implementation cost of such devices.

Furthermore, it is necessary to mechanically dissociate the plug, which must remain in a fixed and sealed position on the casing, from the lash compensation mechanism, which necessarily includes parts that are movably mounted relative to the casing, and that should not interfere with said plug in order to avoid any risk of failure, in particular any risk of jamming of said movable parts or accidental expulsion of the plug.

Of course, herein again, such a requirement tends to increase the overall bulk of the casing, and to complicate the assembly operations, to the detriment of the manufacturing cost.

Consequently, the objects assigned to the invention aim at overcoming the aforementioned drawbacks, and at proposing a new casing arrangement whose assembly is simple and rapid and which allows combining in a compact manner and at a lesser cost the sealing and backlash compensation functions.

The objects assigned to the invention are achieved by means of a plug intended to close an orifice of a casing, said plug comprising a solid hub, with a central axis (XX'), arranged so as to plug the orifice of the casing, as well as a retaining member secured to the hub and arranged so as to cooperate with the casing in order to ensure the axial fastening of the plug in the orifice of the casing, said plug being characterized in that it includes:

- a lash adjustment carriage, which is distinct from the hub and which is movably mounted on a guide support carried by the hub, said guide support being arranged so as to axially retain said carriage and to guide the relative displacement of said carriage relative to the hub according to a direction called «lash adjustment direction» (ZZ') transverse to the central axis (XX'),
- a spring-type elastic member interposed between the guide support and the carriage so as to elastically urge said carriage in displacement according to the lash adjustment direction (ZZ'),
- an orientation member arranged so as to be able to cooperate with a matching orientation member provided in the casing, so as to orientate the plug, and consequently the lash adjustment direction defined by the guide support, in azimuth around the central axis (XX'), according to a predetermined orientation with respect to the casing.

Advantageously, the invention allows combining, within the same subset forming the plug, a hub which ensures the sealed plugging of the casing, a movable and elastically-biased carriage which ensures the backlash adjustment of the mechanism contained within the casing, and an orientation member which forms a foolproof device allowing defining immediately, during the assembly of the plug on the casing, the proper orientation of the lash adjustment direction according to which the carriage should be displaced.

Thus, all of the functions useful for sealed plugging and lash adjustment are grouped together within the same subset which is compact, easy and rapid to mount in one single operation on the casing.

Other objects, features and advantages of the invention will appear in more detail on reading the following description, as well as using the appended drawings, provided for purely illustrative and non-limiting purposes, among which:

FIG. 4 is a longitudinal sectional view, viewed from the bottom, of the device of FIG. 3.

FIG. 5 illustrates a variant of the plug according to the invention comprising a hub which is formed by the assembly of two nested plug elements.

FIG. 6 is a perspective view of a casing portion showing an orifice arrangement adapted to receive a plug according to the invention.

FIGS. 7 and 8 illustrate, according to front and rear perspective views, a plug element of FIG. 5 provided with a guide support.

The invention concerns a plug 1 intended to close an orifice 2 of a casing 3.

Figure 1:
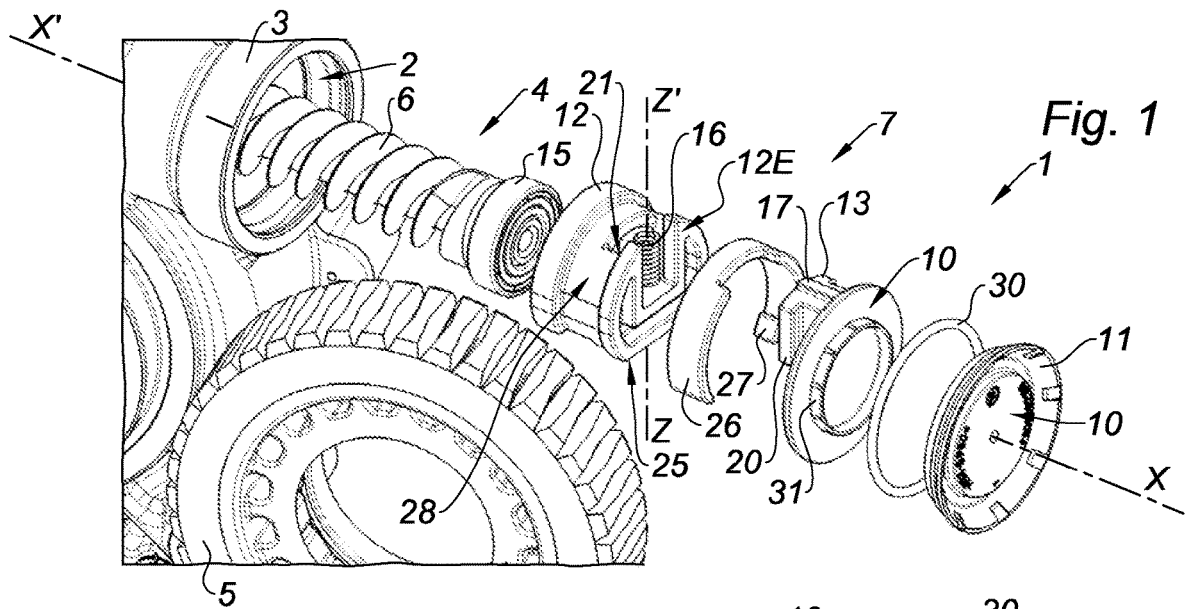
FIG. 1 and FIG. 2 illustrate, in respectively top and bottom perspective exploded views, the implementation of a plug according to the invention within a casing accommodating a worm wheel and worm screw reducer mechanism.
Figure 2:
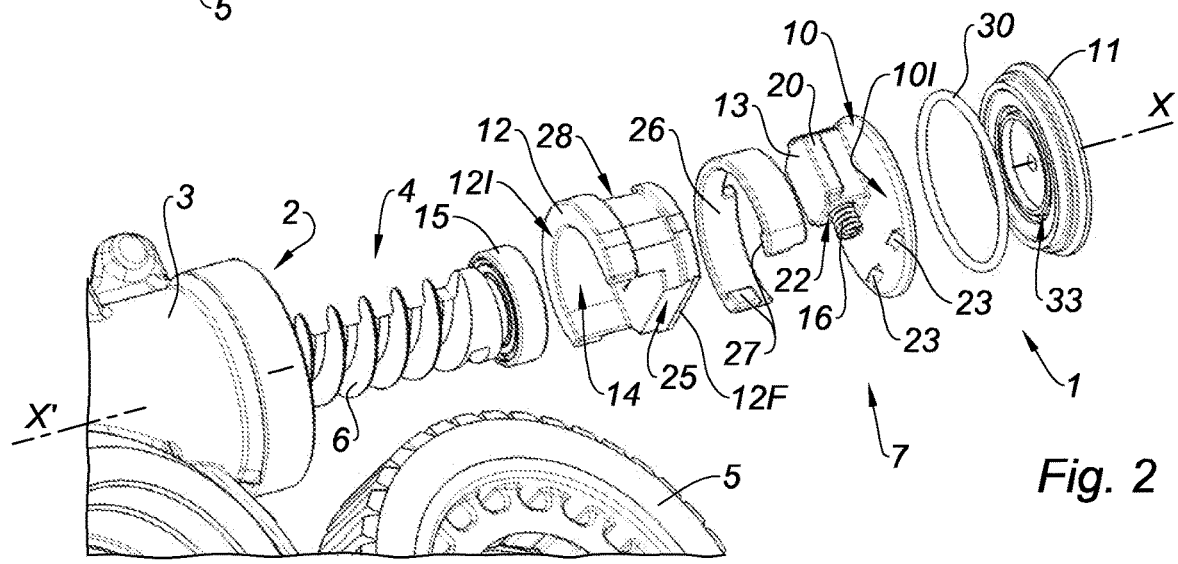
Figure 3:
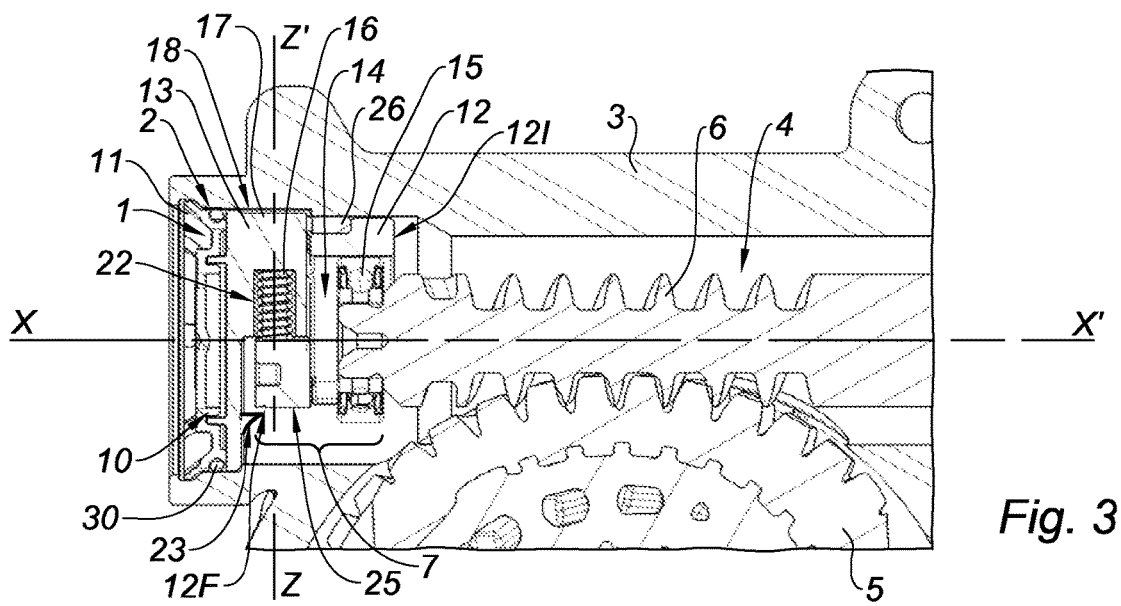
FIG. 3 is an assembled view, viewed in a side longitudinal section, of the device of FIGS. 1 and 2.

The casing 3 may be metallic or made of a rigid plastic material, and accommodates a gear mechanism 4, as shown in particular in FIGS. 1 to 3.

Preferably, the mechanism 4 is a reducer, for example a worm wheel 5 and worm screw 6 reducer 4.

According to a preferred application variant, the mechanism 4 is part of a power steering system for a vehicle.

More particularly, the mechanism 4 may form a reducer which ensures a mechanical transmission between a steering power assist motor and a movable member, such as a rack or a steering column, which allows modifying the yaw orientation (steering angle) of the steered wheels of a vehicle.

The casing 3 also contains a backlash adjustment device 7, which press radially, and in an elastic manner, the toothings of the gear against each other, herein which press the toothing of the worm screw 6 against the toothing of the wheel 5, so as to suppress the backlashes, and thus attenuate the operating noises, the shocks and the vibrations in the mechanism 4.

The plug 1 comprises a solid hub 10, with a central axis (XX'), arranged so as to plug the orifice 2 of the casing.

The plug 1 also comprises a retaining member 11 which is secured to the hub 10 and arranged so as to cooperate with the casing 3 in order to ensure the axial fastening of the plug in the orifice 2 of the casing.

Preferably, the retaining member 11 is a collar which cooperates by snap-fitting with a groove drilled in the wall of the orifice 2.

Thus, it is possible to easily fasten the plug 1 to the casing 3.

Furthermore, such a solution allows pushing the plug 1 into the orifice 2, setback with respect to the apparent surface of the casing 3, which protect the plug from degradations or an accidental pull-out.

That being so, it is possible to fasten the plug 1 to the casing 3 by any other suitable fastening means, for example by one or several fastening screw(s) which would hold the retaining member 11 against the casing 3, yet without departing from the invention.

According to the invention, the plug 1 includes a lash adjustment carriage 12, distinct from the hub 10 and which is movably mounted on a guide support 13 carried by the hub 10.

Thus, the invention allows combining within the same plug 1 sealed plugging members and lash adjustment members.

Said guide support 13 is arranged so as to axially retain said carriage 12, in order to make the carriage 12 be trapped by the hub 10 according to the direction of the central axis (XX').

Thus, the guide support 13 prevents said carriage 12 from detaching off the hub 10, and therefore off the plug 1, when the plug 1 is in place in the casing 3, and during the operation of the mechanism 4.

Said guide support 13 is also arranged so as to guide the relative displacement of the carriage 12 relative to the hub according to a direction called «lash adjustment direction» (ZZ') transverse to the central axis (XX').

More preferably, said guide support 13 guides the carriage 12 in rectilinear translation, preferably exclusively in rectilinear translation, according to said lash adjustment direction (ZZ').

Preferably, said lash adjustment direction (ZZ') is substantially perpendicular to the central axis (XX'), that is to say it forms with said central axis (XX') an angle equal to 90 degrees+/−3 degrees or +/−5 degrees.

This direction corresponds to the direction of the backlash adjustment, according to which the position and/or the axis spacing of the toothed elements of the gear mechanism 4, herein more particularly the axis spacing between the worm wheel 5 and the worm screw 6.

More preferably, the plug 1 will be placed so that the central axis (XX') coincides with the nominal axis of rotation of the worm screw 6, such that the carriage 12 could dynamically accommodate, by being displaced relative to the fixed hub 10 according to the lash adjustment direction (ZZ'), the radial displacement components, that is to say perpendicular to the central axis (XX'), of the worm screw 6.

In the following, for convenience of the description, it will be considered that the plug 1 is coaxial with the worm screw 6, and reference will be made to a common central axis (XX').

By «axial», it should be understood a direction parallel and even coincident with the considered axis (by default, the central axis (XX')), and by «radial», a direction perpendicular to said considered axis.

Preferably, as shown in FIGS. 2, 3 and 4, the carriage includes a bearing housing 14 which is arranged so as to receive a bearing 15, such as a roller bearing, which supports the worm screw 6, preferably an end of the worm screw 6, in rotation about the central axis (XX').

In a particularly preferred manner, the bearing 15 is mounted so as to be secured to the carriage 12.

According to the invention, the plug also includes a spring-type, and more preferably a helical spring-type, elastic member 16 which is interposed between the guide support 13 and the carriage 12 so as to elastically urge said carriage 12 in displacement according to the lash adjustment direction (ZZ').

The action direction of the elastic member 16 is selected so that the biasing force developed by said elastic member 16 against the carriage 12 tends to push the carriage 12, and consequently the bearing 15 and the worm screw 6, towards and against the worm wheel 5.

Thus, the carriage 12 ensures an elastic suspension which compensates for the radial position variations of the worm screw 6, relative to the casing 3 and relative to the fixed hub 10.

Thus, the lash adjustment device 7 comprises, in fine, at least one carriage 12 movably mounted on the hub 10 and the elastic member 16.

According to the invention, the plug 1 further includes an orientation member 17 arranged so as to be able to cooperate with a matching orientation member 18 provided in the casing 3, so as to orientate the plug 1, and more particularly the hub 10 and the guide support 13, and consequently the lash adjustment direction (ZZ') defined by the guide support 13, in azimuth around the central axis (XX'), according to a predetermined orientation relative to the casing 3.

Preferably, the orientation member 17 of the plug 1 will be in the form of a male radial protrusion, such as a rib parallel to the central axis (XX'), and which will be brought to cooperate with a matching orientation member 18 formed by a female depression, such as an axial slot, drilled in the inner surface of the wall of the orifice 2, as illustrated in FIG. 6.

Such an orientation member 17 thus forms a foolproof device which allows indexing the lash adjustment direction (ZZ') materialized by the guide support 13, and which consequently allows properly positioning the plug 1, and therefore the lash adjustment device 7, as of the engagement of the plug 1 into the orifice 2.

Advantageously, the invention therefore allows, in fine, embedding a lash adjustment device 7 directly on the plug 1, into one single and compact subset, which can be advantageously manipulated as one unit and engaged in its entirety, by axial approach according to the central axis (XX'), into the orifice 2 of the casing 3 and on the worm screw 6, and more particularly on the bearing 15 already mounted on the worm screw 6 and therefore already present in the casing 3.

Hence, the invention simplifies the simultaneous set-up of all of the sealed plugging and lash adjustment functions, by a simple set-up of a plug 1 forming a mechanical subset which combines all of these functions (sealed plugging, lash adjustment, orientation of the lash adjustment).

Preferably, the guide support 13 is formed integrally in one-piece with the hub 10.

This enables a simple and rapid manufacturing, and a solid fastening of the guide support 13 on the hub 10.

More preferably, the hub 10 and the guide support 13 will be formed integrally in one-piece by molding, for example by injection molding, preferably of a thermoplastic material, both light and corrosion-resistant.

In particular, said thermoplastic material may be selected from polybutylene terephthalate (PBT), polyamide (PA66), polyphthalamide (PPA66).

It is advantageously possible to incorporate into said material reinforcing fibers, for example glass fibers, preferably in an amount from 30 weight % to 50 weight %.

Preferably, the guide support 13 forms, and preferably is formed by, a male excrescence 20 which projects axially on a face of the hub called «inner face» 10l.

Said inner face 10l forms a base of said hub, preferably substantially perpendicular to the central axis (XX'), and which is intended to be oriented axially towards the inside of the casing 3, herein, therefore, towards the worm screw 6.

As shown in FIGS. 1, 2, 4, 5, 7 and 8, said male excrescence 20 has, in a cross-section normal to the lash adjustment direction (ZZ'), a hook-like shape.

Preferably, said hook-like shape is in the form of a dovetail or, as illustrated in the aforementioned figures, in the form of a «T».

This hook-like shaped male excrescence 20 cooperates with a female slot 21 with a matching shape drilled in the carriage 12, to guide the carriage 12 in translation according to the lash adjustment direction (ZZ').

The hook-like shape of the male excrescence 20 advantageously ensures the axial retention of the carriage 12 on the hub 10.

Said hook-like shape further forms some kind of rail which offers a robust and accurate sliding guidance of the carriage 12.

Preferably, the orientation member 17 is formed integrally in one-piece with the hub 10 and/or integrally in one-piece with the guide support 13, preferably in the form of an axial rib.

In order to facilitate the manufacture of the plug 1 as well as the selection of the orientation of the hub 10 in the casing 3, said orientation member 17 is preferably located in the continuation of the lash adjustment direction (ZZ'), which preferably coincides with the main axis of the helical spring 16 and with the longitudinal direction of the male excrescence 20.

More preferably, the orientation member 17 will be formed in centrifugal radial projection on the rear face of the guide support 13, opposite to the carriage 12 and the worm screw 6.

Preferably, as shown in particular in FIGS. 2, 3 and 4, the guide support 13 has a receiving hole 22, drilled according to the lash adjustment direction (ZZ'), to receive the elastic member 16.

As indicated hereinabove, said elastic member 16 is preferably formed by a helical spring 16, herein engaged coaxially into said receiving hole 22.

Thus, it is possible to house the elastic member 16 in a stable manner and within a confined space.

Furthermore, by substantially centering the receiving hole 22, and therefore the action of the elastic member 16 with respect to the guide surfaces (bearing surfaces) the guide support 13 offers to the carriage 12, and more particularly offers to the female guide slot 21, the lash adjustment force exerted by the elastic member 16 is balanced, which allows in particular avoiding a tilting or a jamming of the carriage 12 against the guide support 13.

According to a preferred feature which may constitute an invention on its own, in particular independently of the presence or not of an orientation member 17 on the plug 1, the hub 10 has an inner face 10l, intended to be axially oriented towards the inside of the casing 3, herein towards the worm screw 6, and located opposite the carriage 12, and said inner face 10l is provided with at least one lug 23, and preferably two lugs 23, intended to retain the carriage 12 on the guide support 13 in order to prevent an accidental dislocation of the carriage 12 out of the guide support 13 according to the lash adjustment direction (ZZ') during the manipulation of the plug 1 out of the casing 3 and/or during the mounting of the plug 1 on the casing 3.

Hence, the presence of such lugs 23 facilitates the transportation and the mounting of the hub 10/carriage 12 subset which is pre-constituted before its insertion into the orifice 2 of the casing 3.

As shown in FIG. 7, the lugs 23 project axially, according to the direction of the central axis (XX'), on the inner face 10l of the hub, so as to form stops on the path of the carriage 12, which corresponds to the lash adjustment direction (ZZ').

Said lugs 23 are located at a distance from the guide support 13, and more particularly at a distance from the male excrescence 20, according to the lash adjustment direction (ZZ').

Said lugs 23 are sufficiently axially away from the guide support 13, and more particularly from the male excrescence 20, according to the lash adjustment direction (ZZ'), so as to avoid that, once the plug 1 is in place in the casing 3, and during the operation of the mechanism 4, the carriage 12 does not abut against said lugs 23.

However, said lugs 23 are (also) axially close enough to the guide support 13, and more particularly close enough to the male excrescence 20, according to the lash adjustment direction (ZZ'), so as to be able to block the travel of the carriage 12 along the lash adjustment direction (ZZ') before the carriage 12 is fully dislocated from the guide support 13.

Thus, the lugs 23 form stops which are close enough to the male excrescence so as to hold the carriage 12 on its guide rail, as long as the plug 1 is not yet in the casing 3 and the carriage 12 does not yet cooperate with the bearing 15 and the worm screw 6.

Preferably, the lug(s) 23 are arranged so as to retain, when the plug 1 is out of the casing 3, the carriage 12 on the guide support 13 against the elastic member 16 which is at least partially compressed.

Thus, when the plug 1 is out of the casing 3, the elastic member 16 elastically presses the carriage 12, and more particularly the front face 12F of said carriage 12 intended to be oriented towards the worm wheel 5, against the lug(s) 23, in a position called «forward» position, which corresponds to a position away from the guide support 13 according to the lash adjustment direction (ZZ'), and (virtually) close to the worm wheel 5.

This elastic holding of the carriage 12 against the lugs 23 confers to the subset constituting the plug 1 a great stability during its transportation and manipulation out of the casing 3.

When the plug 1 is set in place in the casing 3, and the carriage 12 is engaged against the bearing 15 and the work screw 6, the action of the bearing 15, which is retained transversely to the central axis (XX') by the worm screw 6 which, in turn, bears against the worm wheel 5, pushes the carriage 12 back along the lash adjustment direction (ZZ'), against the elastic member 16, towards a function position called «backward» position closer to the guide support 13 and farther from the worm wheel 5 than the forward position, thereby pulling the front face 12F of the carriage 12 off the lugs 23 in order to form a sufficient functional axial lash between the carriage 12 and the lugs 23, along said lash adjustment direction (ZZ').

Moreover, it should be noted that the lugs may form anti-return pawls enabling the insertion of the carriage 12 on the guide member 13 along the lash adjustment direction (ZZ'), in a passing direction, but resisting the separation of the carriage 12 and the guide member 13 in an opposite blocking direction.

Alternatively, or complementarily, the carriage 12, the guide support 13 and the lugs 23 may be dimensioned so as to enable an initial insertion of the carriage 12 on the guide member 13 by a slightly inclined access (that is to say by imparting to the carriage 12 a slight inclination) with respect to the lash adjustment direction (ZZ'), in order to facilitate the crossing of the lugs 23, by slipping of the carriage 12 above said lugs 23, in the passing direction.

Moreover, it should be noted that the two lugs 23 are preferably spaced apart so as to extend on either side of a passage interval 24 located in the continuation of the receiving hole 22, according to the lash adjustment direction (ZZ'), at the side oriented towards the worm screw 6 and the worm wheel 5.

Indeed, said passage interval 24 allows leaving the passage to a molding core engaged against the inner face 10l of the hub, according to the lash adjustment direction (ZZ'), to form said receiving hole 22.

According to a preferred feature which may constitute an invention on its own, the carriage 12 is formed, as shown in particular in FIGS. 1 and 2, by a portion of a cylinder oriented according to the central axis (XX'), and more specifically centered on the central axis (XX') when the carriage 12 is in the nominal position.

Said cylinder portion comprises on a face 12E, herein the axially outer face oriented towards the outside of the casing 3 according to the central axis (XX'), a guide slot 21 intended to cooperate with the guide support 13 of the hub 10 to axially retain the carriage on the hub 10 while enabling the sliding of the carriage 12 according to the lash adjustment direction (ZZ').

Said cylinder portion also comprises, on the axially opposite face 12I, herein the inner face 12I oriented towards the inside of the casing 3 and the worm screw 6, a bearing housing 14 which is arranged so as to accommodate a bearing 15, such as a roller bearing 15, intended to support and guide in rotation a worm screw 6 contained within the casing 3.

Thus, the carriage 12 may have a particularly compact shape, which is also easy to obtain by molding.

The cylinder portion forming the carriage 12 is preferably truncated, in its lower portion, radially the closest to the meshing area between the worm screw 6 and the worm wheel 5, by a flattened surface 25.

Preferably, said flattened surface 25 coincides with the front face 12F of the carriage intended to temporarily bear against the lugs 23, before the set-up of the plug 1 in the casing 3.

Advantageously, by truncating the cylinder portion forming the carriage 12, the carriage 12 is lightened and any interference of said carriage 12 with the gear mechanism 4 is avoided.

Nevertheless, the angular coverage of the bearing housing 14, around the central axis (XX'), is strictly larger than 180 degrees, so that the carriage occupies more than one half-cylinder, so as to radially retain the bearing 15, herein in a position coaxial to the carriage 12.

Advantageously, the bearing housing 14 opens onto the inner face 12I of the carriage 12, such that said carriage could be directly engaged on the bearing 15, and thus cover said bearing 15, when the plug 1 carrying said carriage 12 is pushed axially into the orifice 2 of the casing 2.

Preferably, the (radially outer) periphery of the carriage 12 is provided with a damper pad 26 made of elastomer, preferably with a slit annular shape, which is intended to cooperate with the inner wall of the orifice 2 in order to avoid or attenuate the shocks of the carriage 12 against the casing 3.

Preferably, the damper pad 26 is made of hydrogenated acrylonitrile butadiene rubber, usually referred to by the acronym HNBR, or of silicone.

Preferably, the damper pad 26 is attached in radial over-thickness in a peripheral groove 28 provided to this end on the periphery of the cylinder portion forming the carriage 12.

Preferably, said damper pad 26 is retained by elastic hooking by means of terminal hooks 27 which cooperate with corresponding flanges of the carriage 12, substantially at the level of the flattened surface 25.

Advantageously, this damper pad 23 imparts a complementary elastic lateral bearing to the carriage 12 against the casing 3, herein preferably at an axial distance from the bearing surfaces of the carriage 12 against the guide support 13, which allows dampening and avoiding shocks between the carriage 12 and the casing 3, and therefore noises, in particular during the reversals of the direction of rotation of the worm screw 6 (which typically occur during the reversals of steering of the power steering system).

Moreover, the hub 10 is preferably provided with a sealing gasket 30 intended to ensure a junction between the hub 10 and the wall of the orifice 2 which is sealed at least to liquid water.

Preferably, the sealing gasket 30 is made of elastomer.

Preferably, it may be in the form of an O-ring gasket 30.

Alternatively, it is nonetheless possible to make the sealing gasket 30 in the form of an elastomer layer securely deposited, for example by overmolding, along the periphery of the hub 10.

The plug 1, and more particularly the sealing gasket 30, is designed to ensure sealing to runoff liquid water, substantially at atmospheric pressure (about 1 bar), but also at higher pressures, ranging for example up to 100 bar, in order to resist washes by high-pressure cleaners.

The plug 1 also ensures sealing to the lubricant, such as grease or oil, used by the mechanism 4 and present in the casing 3, in order to avoid any lubricant loss.

Moreover, according to a preferred variant, the plug 1, and more particularly the hub 10, is preferably formed into two nested portions 10A, 10B, coupled to each other according to a mating plane normal to the central axis (XX') and passing by the bottom of a groove which receives the O-ring gasket 30, as illustrated in particular in FIGS. 4 and 5.

In particular, such an arrangement allows avoiding the connection, and therefore sealing, defects, at the surface of the groove, and therefore between the O-ring gasket 30 and the solid portion of the hub 10.

Preferably, said portions 10A, 10B constitutive of the hub 10 will substantially be in the form of disks, the first disk 10A carrying the retaining member (collar) 11, and the second disk 10B carrying the guide support 13.

The nesting may be achieved by providing on one of the disks 10A, 10B a crown 31, preferably provided with radial protrusions 32, intended to be tightly engaged into a circular slot 33 drilled in the other disk 10B, 10A.

Thus, the invention may also cover, as such, a plug element 10B, herein a disk 10B, intended to be part of a casing 3 plug 1, said plug element 10B comprising a (solid) hub 10, preferably made of a thermoplastic material, with a central axis (XX'), on a face 10l of which is formed, integrally in one-piece with the hub 10, a projecting guide support 13 which forms a guide rail with a hook-like section, for example a «T»- or dovetail-like shape, intended to retain and guide a carriage 12, and oriented according to a direction called «lash adjustment direction» (ZZ') transverse to the central axis (XX'), said guide support 13 also carrying an orientation member 17, such as an axial rib 17, allowing defining the azimuthal orientation of said lash adjustment direction (ZZ') with respect to the central axis (XX').

Such a plug element 10B is intended to be fastened, preferably by nesting, to another plug element 10A with a complementary shape, so as to reconstitute the hub 10 of the plug 1.

The spring 16 is then set in place into the receiving hole 22, and the carriage 12 is fitted radially on the guide support 13, against the spring 16, and temporarily held in place by the lug(s) 23.

The set thus formed may then be attached on the casing 3, fitted axially into the orifice 2 of said casing 3 so as to engage the bearing 15 into the bearing housing 14 of the carriage, and to lock the hub 10 in the casing, by snap-fitting of the collar 11 in the wall of the orifice 2.

Of course, the invention covers any device comprising a casing 3 protecting a gear mechanism 4 and plugged by a plug 1 according to the invention.

Thus, in particular, the invention concerns a reducer comprising a worm wheel 5 and worm screw 6 mechanism 4 housed within a casing 3 plugged by a plug 1 according to the invention, whose hub 10 is coaxial with the axis of rotation of the worm screw 6, and whose lash adjustment carriage 12 is arranged so as to press said worm screw 6 against the worm wheel 5.

Of course, the invention concerns a power steering system comprising a steering casing 3, and more particularly a reducer 4 casing 3, in particular a worm wheel 5 and worm screw 6 reducer 4 casing 3, plugged by at least one plug 1 according to the invention, as well as a vehicle equipped with such a power steering system.

Of course, the invention is not limited to the aforementioned variants, those skilled in the art being in particular capable of freely isolating or combining together either one of the features described in the foregoing or substitute them with equivalents.

The invention claimed is:

1. A plug intended to close an orifice of a casing, said plug comprising
    a hub, with a central axis and without any through-holes, arranged so as to plug the orifice of the casing,
    a retaining member secured to the hub and arranged so as to cooperate with the casing in order to ensure axial fastening of the plug in the orifice of the casing,
    a lash adjustment carriage, which is distinct from the hub and which is movably mounted on a guide support carried by the hub, said guide support being arranged so as to axially retain said lash adjustment carriage and to guide relative displacement of said lash adjustment carriage relative to the hub according to a lash adjustment direction transverse to the central axis,
    a spring-type elastic member interposed between the guide support and the lash adjustment carriage so as to elastically urge said lash adjustment carriage in displacement according to the lash adjustment direction,
    an orientation member configured to cooperate with a matching orientation member in the casing to orient the plug and consequently orient the lash adjustment direction in a predetermined orientation with respect to the casing and a predetermined azimuthal orientation about the central axis.

2. The plug according to claim 1, wherein the guide support is formed integrally in one-piece, with the hub.

3. The plug according to claim 1, wherein the guide support forms a male excrescence which projects axially on an inner face of the hub forming a base of said hub intended to be oriented axially towards the inside of the casing, said male excrescence having, in a cross-section normal to the lash adjustment direction, a hook-like shape, which cooperates with a female slot with a matching shape drilled in the lash adjustment carriage to guide the lash adjustment carriage in translation according to the lash adjustment direction.

4. The plug according to claim 1, wherein the orientation member is formed integrally in one-piece with the hub and/or integrally in one-piece with the guide support.

5. The plug according to claim 1, wherein the guide support has a receiving hole drilled in the lash adjustment direction to receive the elastic member, the elastic member being formed by a helical spring.

6. The plug according to claim 1, wherein the hub has an inner face, intended to be oriented axially towards the inside of the casing, and located opposite the lash adjustment carriage, and said inner face is provided with at least one lug, intended to retain the lash adjustment carriage on the guide support, to prevent an accidental dislocation of the lash adjustment carriage out of the guide support according to the lash adjustment direction during manipulation of the plug out of the casing or during the mounting of the plug on the casing.

7. The plug according to claim 1, wherein the lash adjustment carriage is formed by a portion of a cylinder oriented according to the central axis and which comprises a guide slot on a face intended to cooperate with the guide support of the hub to axially retain the lash adjustment carriage on the hub while enabling sliding of the lash adjustment carriage according to the lash adjustment direction, and which comprises a bearing housing, on the axially opposite face, arranged so as to accommodate a bearing intended to support and guide a worm screw in rotation, the worm screw being contained within the casing.

8. The plug according to claim 1, wherein the periphery of the lash adjustment carriage is provided with a damper pad made of elastomer, intended to cooperate with an inner wall of the orifice to avoid or attenuate shocks of the lash adjustment carriage against the casing.

9. The plug according to claim 1, wherein the hub is provided with a sealing gasket, intended to ensure a junction between the hub and a wall of the orifice which is sealed at least to liquid water.

10. A reducer comprising a worm wheel and worm screw mechanism housed within a casing plugged by a plug according to claim 1, wherein the hub is coaxial with an axis of rotation of the worm screw, and the lash adjustment carriage is arranged so as to press said worm screw against the worm wheel.

11. The plug according to claim 7, wherein the bearing is a roller bearing.

* * * * *